Jan. 24, 1956

O. E. SAARI 2,731,886

METHOD OF MAKING SPEED-REDUCTION GEARING

Original Filed July 12, 1954

INVENTOR.
Oliver E. Saari
BY Olson & Trexler
attys.

Jan. 24, 1956
O. E. SAARI
2,731,886
METHOD OF MAKING SPEED-REDUCTION GEARING
Original Filed July 12, 1954
6 Sheets-Sheet 2
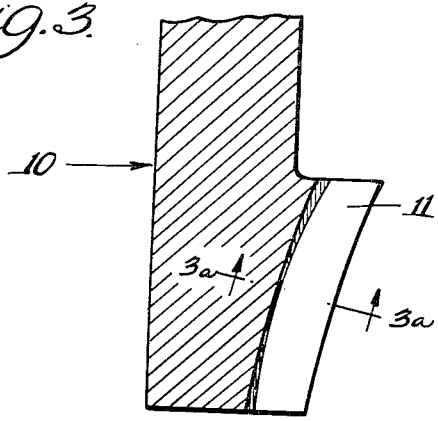
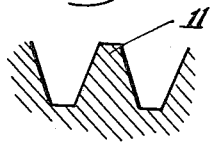
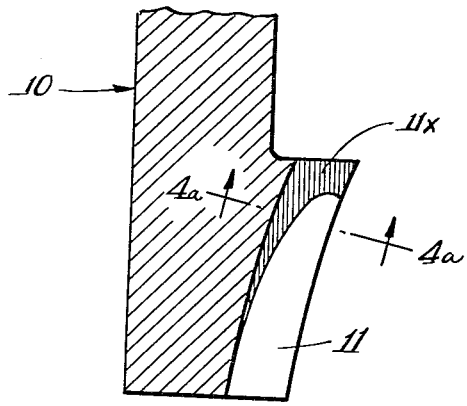
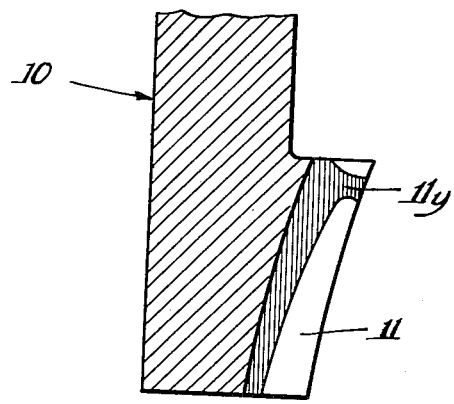
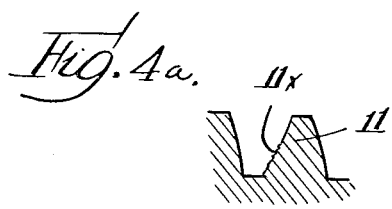
INVENTOR.
Oliver E. Saari
BY Olson & Trexler
Attys.

Jan. 24, 1956     O. E. SAARI     2,731,886
METHOD OF MAKING SPEED-REDUCTION GEARING
Original Filed July 12, 1954     6 Sheets-Sheet 3
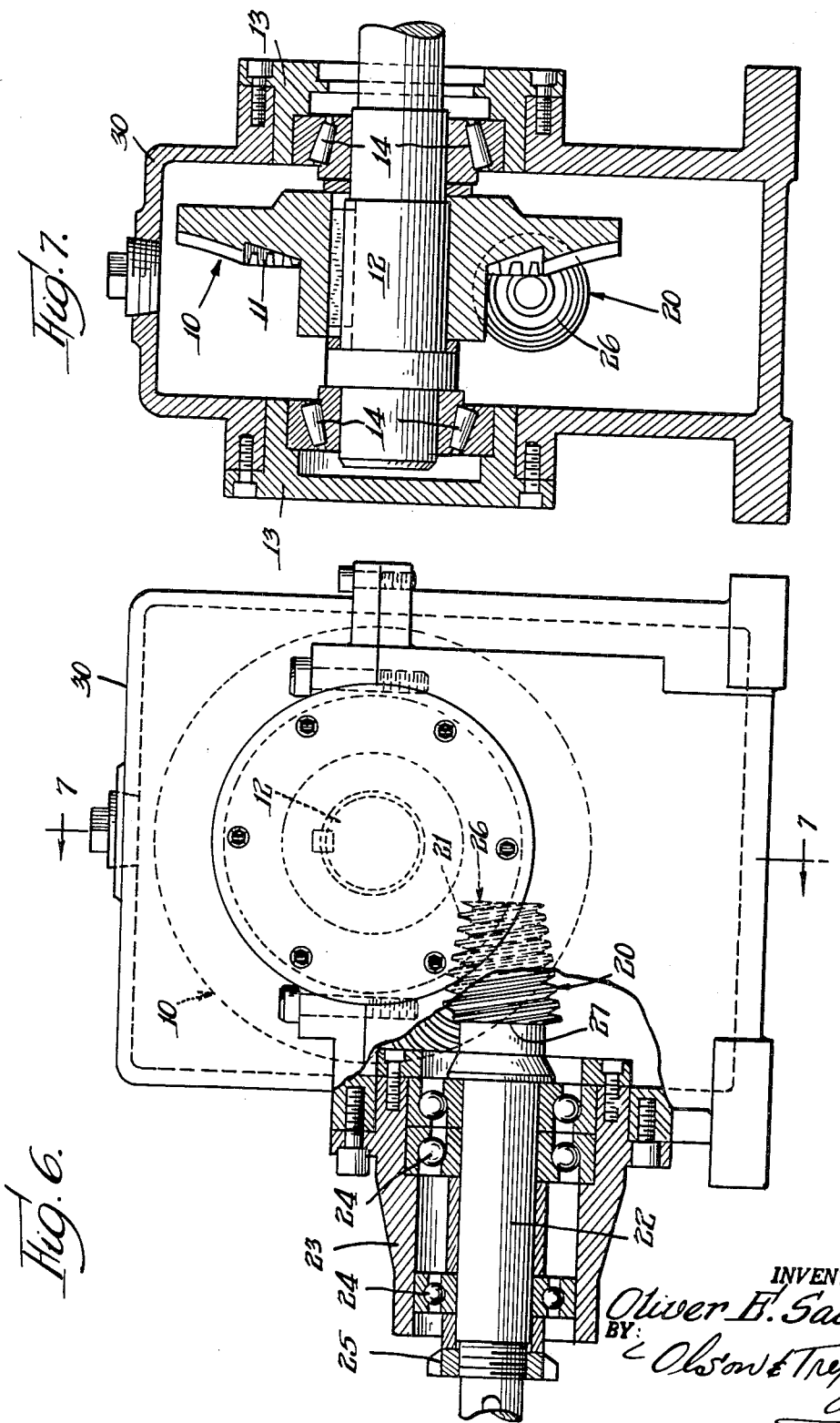

Jan. 24, 1956
O. E. SAARI
2,731,886
METHOD OF MAKING SPEED-REDUCTION GEARING
Original Filed July 12, 1954
6 Sheets-Sheet 4
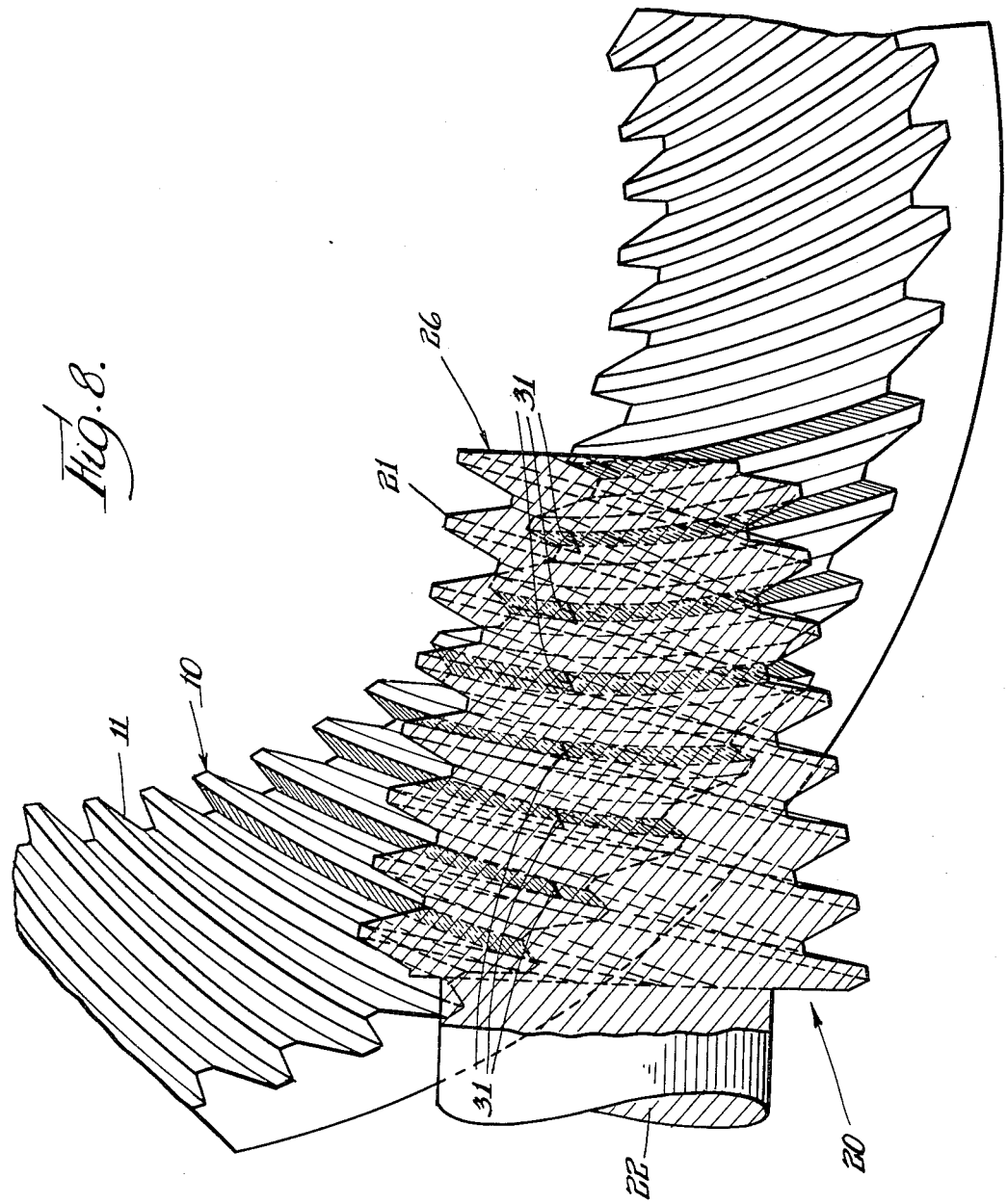
INVENTOR.
Oliver E. Saari
BY Olson & Trexler
attys.

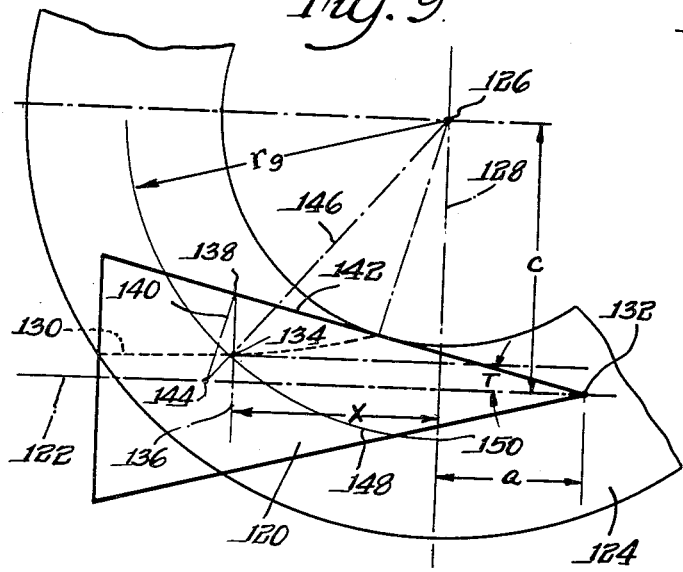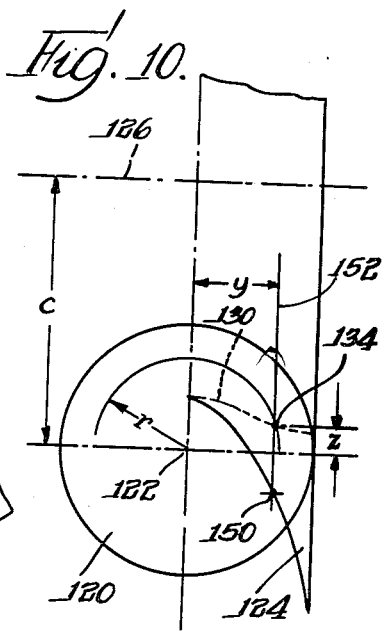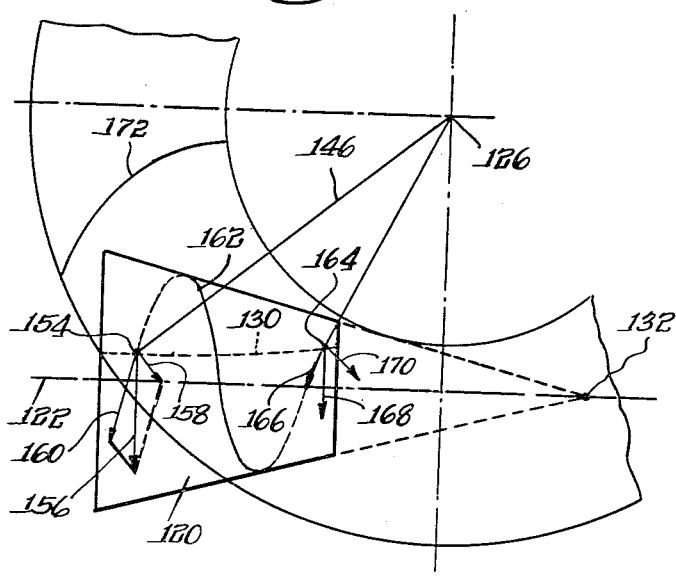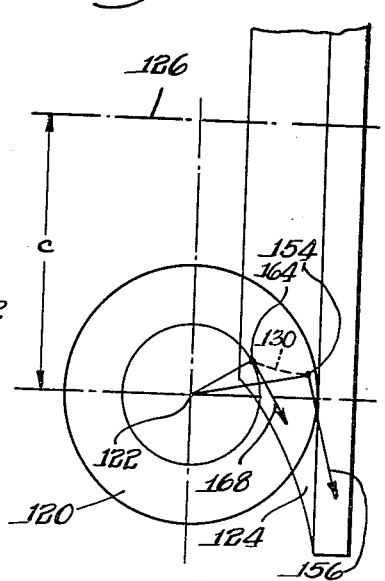

Jan. 24, 1956          O. E. SAARI          2,731,886
METHOD OF MAKING SPEED-REDUCTION GEARING
Original Filed July 12, 1954          6 Sheets-Sheet 6
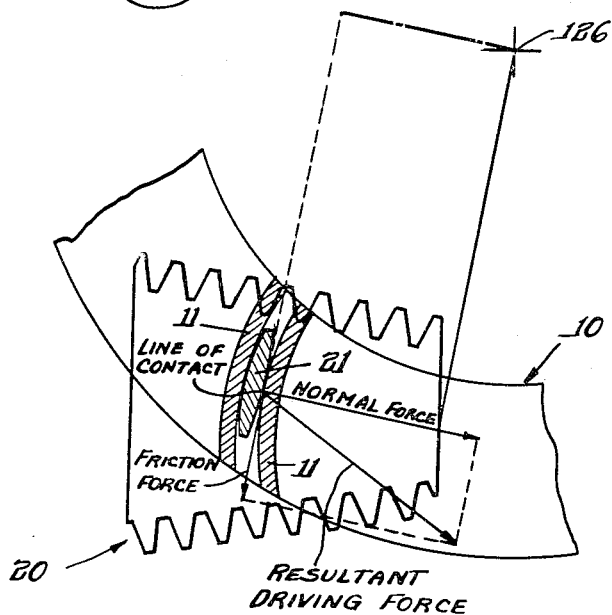
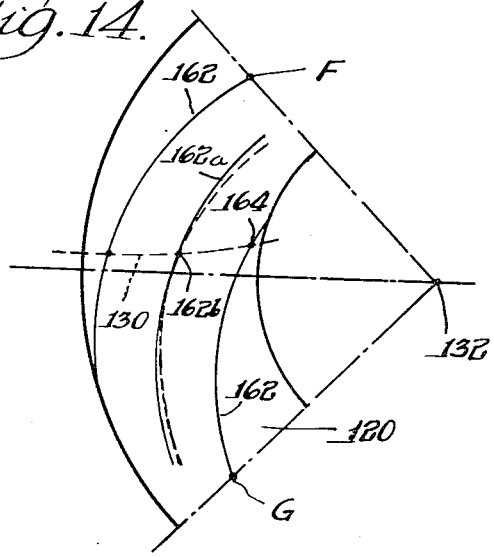
INVENTOR.
Oliver E. Saari
BY Olson & Trexler
attys.

United States Patent Office 2,731,886
Patented Jan. 24, 1956

2,731,886
METHOD OF MAKING SPEED-REDUCTION GEARING

Oliver E. Saari, Chicago, Ill., assignor to Illinois Tool Works, Chicago, Ill., a corporation of Illinois Original application July 12, 1954, Serial No. 442,553, now Patent No. 2,696,125, dated December 7, 1954. Divided and this application August 19, 1954, Serial No. 450,959

2 Claims. (Cl. 90—4)

This invention relates to a novel method of making speed-reduction gearing and aims to provide a skew-axis gearing of large speed-reduction ratio which can be manufactured economically and which is strong and easily adjusted. This application is a division of application Serial No. 442,553, filed in the United States Patent Office on July 12, 1954, now Patent No. 2,696,125.

The commonly used type of reduction gearing in which a worm engages teeth on the periphery of a gear requires very accurate positioning of the axes of the gear and the worm and cannot easily be adjusted to regulate backlash after wear. The area of tooth engagement is small so that the gearing must be made large in order to transmit a substantial amount of power.

Gearing in which a worm engages teeth on the face of a crown or bevel gear has been proposed, but, in order to obtain sufficient tooth engagement in such gearing to transfer substantial power, it has heretofore been considered necessary to give the worm some peculiar form which makes it difficult and expensive to produce. Thus, in some instances the worm has had an excessively large taper, while in others the surface or the thread of the worm has had peculiarities which make it expensive to produce, and in most such gearing a high reduction ratio has not been obtained.

The reduction gearing which I have invented and which may be produced by practicing my new method consists of a conical worm having only a slight taper and having a thread of uniform cross-sectional shape and uniform lead and a beveled gear having teeth with side faces which engage the thread of the worm throughout substantially their entire areas. The gearing, therefore, has a large power transmitting capacity in comparison with its size.

Heretofore it has not been thought possible to obtain adequate tooth engagement in a gearing of this type; but I have discovered that the portion of the side faces of the teeth of the gear which may be made to engage the thread of the worm depends upon the lead of the worm, so that by giving the lead a critical value hereinafter defined the tooth engagement is made nearly complete.

In making the gearing which I have invented by following the steps of my novel method, the conical worm may easily be produced on conventional machinery owing to its gradual taper and the uniformity of its thread. At the same time, such machinery may be used to produce a hob having the same form as the worm. This hob is used to generate the teeth on the gear by known methods. This operation would ordinarily generate the fillets and undercut surfaces on the gear which would not contact with the thread of the worm in the operation of the gearing and would thus give it a low power transmitting ability. In practicing the method contemplated by my present application, fillets and undercut surfaces in the teeth of the gear are avoided by giving the lead of the worm a critical relationship to the speed reduction ratio of the gearing and to the position of the worm with respect to the gear.

In order to make the nature of my invention plain, I will describe a specific example of a reduction gearing capable of being produced by employing the method of my present invention. In this description I shall refer to the accompanying drawings in which:

Figs. 1 and 2 are diagrams of gearing embodying the invention showing the important dimensions by which the lead of the worm is determined. Fig. 1 is drawn on a plane which contains the axis of the worm and the common perpendicular to the worm and gear axis. Fig. 2 is taken on the plane parallel to the worm and gear axes and perpendicular to the common perpendicular to the axes;

Fig. 3 is a face view of the concave side of one of the teeth of the gear looking from the center of curvature of the tooth;

Fig. 3A is a transverse section of a tooth of the gear taken on the line 3A—3A of Fig. 3;

Figs. 4, 4A and 5 are views similar to Figs. 3 and 3A showing the tooth which would be formed on the gear if the lead of the hob departed from the critical value in either direction;

Fig. 6 is a side elevation of the gearing embodying the invention in which the angle between the axes of the worm and gear is 90° and shows a mounting for the worm and gear;

Fig. 7 is a vertical section on the line 7—7 of Fig. 6;

Fig. 8 is a perspective of a portion of the gear with an axial section of the worm;

Figs. 9 and 10 are diagrammatic front and end views respectively, of a pair of mating skew axis pitch surfaces;

Figs. 11 and 12 are also diagrammatic front and end views, respectively, graphically illustrating the development of tooth curves on skew pitch surfaces;

Fig. 13 diagrammatically discloses the coaction between the thread of the worm and the complementary teeth of the worm gear to illustrate the manner in which the worm constructed in accordance with the present invention is capable of imparting reverse rotation to a complementary worm gear; and Fig. 14 is a developed view of the conical surface of the worm.

The gearing illustrated consists of a gear 10 having teeth 11 on one side of its side faces and a frusto-conical worm 20 having a thread or threads 21 engaging these teeth. The axes of the gear and worm are in skew relation, that is to say, they are non-parallel and non-intersecting.

Figure 1:
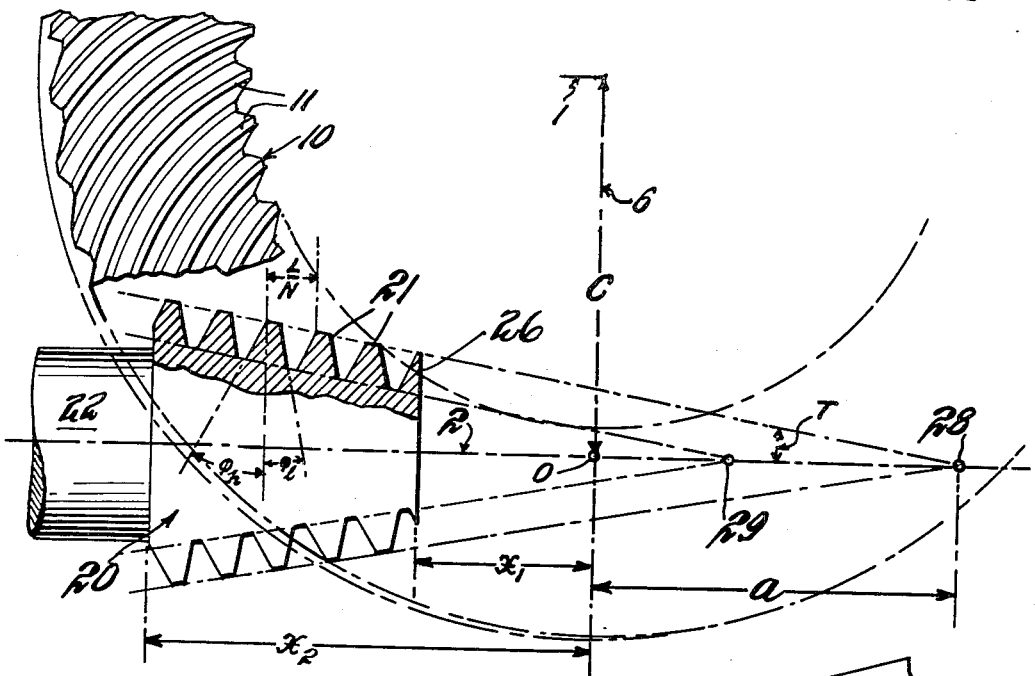

The position of the worm with respect to the gear may most easily be specified by reference to the line 6 which is perpendicular both to the axis 2 of the worm and to the axis 1 of the gear, and to the point of intersection O of this line with the worm axis. As shown in Fig. 1, the worm is located wholly at one side of the common perpendicular 6 with its smaller end 26 close enough to this line to place the apex 28 of a conical surface containing an outer surface of the thread 21 and the apex 29 of a conical surface containing the bottom surface of its thread 21 at the opposite side of this line. In a gearing in which the axes of the worm and gear are perpendicular, the common perpendicular to the axes lies in a plane which is coincident with the gear axis and extends normal to the worm axis, and in this case the worm is located on one side of this plane and the apices 28, 29 on the other side of this plane.

Figure 2:
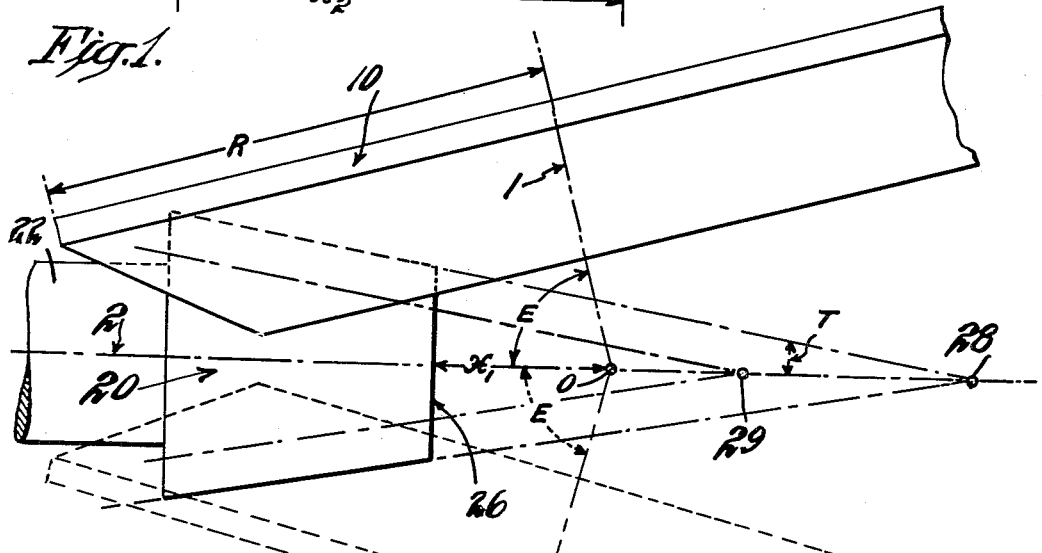

The following dimensions indicated in Figs. 1 and 2 may be used to specify accurately the position of the worm with respect to the gear:

The distance C between the axis of the worm and the axis of the gear measured along the common perpendicular to the two axes, which is less than R, the outer radius of the gear;

The angle E between the axes of the worm and gear measured from the worm axis in a plane parallel to both axes as shown in Fig. 2. This angle should be between 45° and 135°, and in many cases may most conveniently be made 90°;

The distance $x_1$ from the smaller end of the worm to the point O of the common perpendicular 6;

The distance $x_2$ from the larger end of the worm to the point O of the common perpendicular 6;

The distance $a$ from the point O of the common perpendicular 6 to the apex of the conical surface containing the outer surface of the thread of the worm.

The form of the worm 20 is the frustum of a cone of moderate, as distinguished from abrupt, taper. The taper angle of the worm, that is, the angle T between its side and its axis, is small. The thread 21 of the worm 20 is of uniform lead, L, and uniform cross-sectional shape and height. For multiple-start worms, the axial pitch, or distance between adjacent threads, is equal to the lead divided by the number of threads, or $$\frac{L}{N}$$

as shown on the drawing. In the particular worm illustrated, the thread 21 is a triple thread so that the axial pitch is $$\frac{L}{3}$$

The cross-sectional shape of the thread is determined by the pressure angle $\phi_h$ on the high side of the thread, that is, the side facing the larger end of the worm, and the pressure angle $\phi_l$ on the low side of the thread, that is, the side facing the smaller end of the worm.

The gearing may easily be made by using ordinary cutting and grinding machinery to form the frusto-conical worm 20 and a hob of the same size and shape as the worm. This hob is then used to cut the teeth 11 of the gear 10 by feeding it into a positional relationship to the gear blank which is the same as the positional relationship of the worm to the gear in the completed gearing illustrated in Figs. 1 and 2. During hobbing, the hob and the gear blank are rotated on their axes. The number of revolutions of the hob during each revolution of the gear blank determines the ratio between the number of teeth formed on the gear blank and the number of threads of the hob and thus determines the speed reduction ratio K which the finished gearing will have.

The hobbing operation which has been described will in general result in forming teeth on the gear having objectionable inactive fillets or undercut portions so that a satisfactory gear will not be produced. I have discovered that these objectionable features may be avoided by giving the lead of the thread of the worm and the hob a critical relationship to the gear reduction ratio and the coordinates determining the position and shape of the worm. In this way, useful cooperation between the thread of the worm may be extended over substantially the entire side surfaces of the gear teeth.

The critical value of the lead L of the thread of the worm measured along its axis is given by the following equation:

$$L = \frac{2\pi(C - P \sin \phi)}{K \csc E - \left[\frac{x}{P} \cos \phi + \left(\frac{C}{P} \sin \phi - 1\right) \cot E\right]} \quad (1)$$

where $$P = (a+x) \tan T$$

and $$\sin \phi = \frac{B - A\sqrt{A^2 + B^2 - 1}}{A^2 + B^2}$$

where $$A = -\cot E \cot T$$

and $$B = \frac{P + x \cot T}{C}$$

In using this equation, $x$ may be given any value between $x_1$ and $x_2$ so that it represents the distance from the common perpendicular to an intermediate point of the worm, but in most cases, and especially where the gear ratio is below 30:1, it is desirable to make the value of $x$ between $x_1$ and $$\frac{x_1 + x_2}{2}$$

so that it represents the distance from the common perpendicular to a point of the worm between its middle and its smaller end. The lead must also have the proper hand. For the relative position of the worm and gear shown in the drawings, the lead must be right hand. If the gear is made to bear on the other side of the worm as shown in dotted lines in Fig. 2, or any other change is made in the mounting which results in a similar change of relative position, the lead must be left hand.

The angle between the axis of the gear and the axis of the worm is usually determined by the arrangement which is most convenient in the machinery in which the reduction gearing is to be used. In many cases, it is convenient to place these axes at right angles. In this case, the formula for the critical lead may be simplified. When the angle E between the axes is 90°, cot E becomes 0 and csc E becomes 1. Equation 1 then reduces to $$L = \frac{2\pi C}{K \frac{[(a+x)\tan^2 T + x]}{x} - \frac{\sqrt{[(a+x)\tan^2 T + x]^2 - C^2 \tan^2 T}}{(a+x)\tan T}} \quad (2)$$

In using Equation 2, as in using Equation 1, $x$ may be given any value between $x_1$ and $x_2$, but is preferably given a value between $x_1$ and $$\frac{x_1 + x_2}{2}$$

In Equations 1 and 2, $x$ represents the distance from the common perpendicular 6 to that point of the gearing at which there is complete conjugate contact between the gear teeth and the worm thread. This point may be termed the pitch point. When the value of $x$ is chosen between $x_1$ and $$\frac{x_1 + x_2}{2}$$

the pitch point is located on the inner half of the worm and the inner half of the face of the gear.

In order that the critical lead specified in the above equations may have its intended effect of substantially avoiding inactive fillets in the teeth of the gear, the speed reduction ratio should be greater than 9:1, and some care should be exercised in selecting the position and shape of the worm.

The gear ratio K of the gearing illustrated is 20. The gear has sixty teeth and the worm three threads or a triple thread. As the gear ratio is reduced the worm becomes more difficult to manufacture and the hob, even if of the critical lead, tends to create fillets on the gear teeth. For these reasons, the gear ratio should not be made less than 9. On the other hand, the gear ratio may be increased above 20 without introducing any difficulties or disadvantages until it is made so great that the thread and teeth become too fine to transmit power adequately. Gear ratios as high as 200 are practicable on large gears.

The taper angle T of the cone in the gearing illustrated is 10°. It is desirable to make the taper angle as large as 10° or even as great as 15° when gear ratios are under 15. On the other hand, in the case of large gear ratios the taper angle may be reduced to as little as 2°, although the 10° angle is more desirable. The dimensions $x_1$, $x_2$ and $a$, which with the taper angle $T$ determine the size of the worm, may be given any value desired provided, of course, that the length of the worm, $x_2-x_1$, must be great enough to extend across the teeth of the face of the gear. In the specific example illustrated, $x_1=2$ inches, $x_2=5$ inches, and $a=4$ inches.

The pressure angle $\phi_h$ on the high side of the thread of the worm illustrated is 30°. This value is not critical, but to avoid inactive fillets on the gear the high side pressure angle should be at least 20°. The angle should be held below 45° in order to avoid unnecessarily high tooth pressures in the operation of the gearing.

The pressure angle on the low side $\phi_l$ of the thread in the gearing illustrated is 10°. This value is not critical and the angle may be reduced to 0° although this tends to introduce difficulties in grinding the worm. On the other hand, the angle should be kept below 20° in order to avoid short tooth profiles and high tooth pressures.

The ratio C/R of the distance between the axes to the outer radius of the gear determines both the extent of the tooth contact zone and the tooth pressures required. In the gearing illustrated, the outer radius R of the gear is 6%2 inches and the distance C is 4 inches so that the ratio C/R is 0.643, but it is not critical. C should always be less than R but it need be only slightly less than R when the axis angle E is small and may be only one-third of R when E is large. When the axes are at right angles, the most advantageous value of C/R depends upon the gear ratio and it may be said in general that when the gear ratio is above that of the gearing illustrated, it is desirable to make the ratio C/R between 0.8 and 0.6, while for lower gear ratios this ratio C/R is most desirably between 0.6 and 0.4. This places the pitch point on a radius of the gear at an angle from 35 to 65° to a plane coincident with the gear axis and parallel to the worm axis.

The importance of the critical value for the lead of the worm in gearing having a gear ratio and dimensions within the limits above specified is illustrated in Figs. 3, 4 and 5. Figs. 3, 4 and 5 show one of the side faces of a tooth cut on the gear by the thread of the hob. Figs. 3A and 4A show the cross-sectional shape of the tooth. The faces of the inactive fillets 11$x$, 11$y$ formed on the tooth are indicated by the dark areas in the face views. Fig. 3 shows the form of the teeth cut on the gear in the gearing which is illustrated. Figs. 4 and 5 show the form of teeth which would be cut on the gear in a gearing of precisely the same dimensions if the lead departed from the critical value. Figs. 4 and 4A show the effect of increasing the lead above the critical value. Fig. 5 shows the effect of making the lead below the critical value. It should be noticed that the teeth shown in Figs. 4 and 5 have inoperative fillets which materially reduce their operative faces. Fig. 3, on the other hand, shows that when the critical value of the lead is used, substantially the entire side surfaces of the gear teeth are operative to contact with the thread of the worm and no appreciable fillets are formed. This complete tooth contact gives the gearing a high power transferring ability. Also, the absence of undercuts and fillets on the gear makes it easy to mold a matrix on the gear from which plastic gears may be cast or pressed.

The reduction gearing which has been described has physical differences which distinguish it from the gearings now in common use as well as various types which have been proposed, and possess important practical advantages over such gearing:

The area of contact between the thread of the worm and the teeth of the gear is large both because the side faces of the teeth engage the thread throughout substantially their entire areas and because a number of helices of the worm thread are engaged simultaneously by teeth of the gear. The lead of the worm is so small that the worm has more than one complete thread helix and may easily be given a number of complete thread helices by using a multiple-start thread such as the triple thread which has been described.

The area of contact between the thread of the worm and the teeth of the gear is much larger than can be obtained with a cylindrical worm engaging teeth on the periphery of a gear. On the other hand, the new gearing can be manufactured as easily and as economically as the ordinary worm reduction gearing and much more economically than various special types of reduction gearing which have been devised to give greater tooth contact, such, for example, as globoidal reduction gearing.

Lubrication of the present gearing is much superior to that of ordinary worm reduction gearing because the lines of contact 31 between the thread and the gear teeth are transverse and nearly perpendicular to the direction of the relative sliding movement of the teeth (as indicated in Fig. 8) so that the oil film is carried into the point where it is used. This is not true of ordinary worm gearing and while it is true to some extent of the so-called hypoid gearing such gearing has been incapable of the large speed reduction required in the reduction gearing.

In Fig. 13, the coaction between the thread 21 of the worm and the complementary teeth 11 of the gear is disclosed. It will be noted that the convex surface of the worm thread and the complementary convex surface of the gear tooth engage to impart driving force to the gear. There is normal force, as indicated in Fig. 13, which is perpendicular to the tangent passing through the line of contact 31, and the force due to friction which acts at right angles to the normal force. The resultant driving force imparts rotation to the gear. It will also be noted that the convex surface of the high side of the worm thread engages with the complementary concave surface of the complementary tooth of the gear 10. The form of the worm and gear teeth is such that rotation in opposite directions may be imparted to the gear 10 by reversing rotation of the driving worm 20. That is to say, the worm does not only propel the gear in its normal driving direction, but is also capable of imparting reverse rotations to the gear.

The forces on the worm in the present gearing are directed principally along the axis of the worm so that bending moments on the worm shaft are small. This has the advantage of permitting a convenient cantilever mounting of the worm as shown in Figs. 6 and 7.

Figs. 6 and 7 show a desirable mounting for retaining the worm and gear in correct relationship in a case where their axes are perpendicular. The mounting includes a box-like frame 30 to which are secured separate gear and worm assemblies. The gear assembly includes a gear shaft 12 to which the gear 10 is keyed and two bearing boxes 13 secured in openings at opposite sides of the frame 30 and containing roller bearings 14 for the gear shaft at opposite sides of the gear 10.

The worm assembly includes the worm shaft 22 on one end of which the worm 20 is mounted, and a bearing box 23 secured in an opening in one end of the frame 30. The bearing box 23 contains separated ball bearings 24 which support the worm shaft. As shown, this support is of the cantilever type requiring no bearing for the worm shaft 22 at the smaller end 26 of the worm 20. A nut 25 screwed on the shaft 22 locks the larger end 27 of the worm 20 against the inner races of the ball bearings 24.

A number of special advantages arise from the fact that the thread of the worm has a uniform lead and uniform cross-section while the body on which it is formed has a gradual taper. Because of this formation the successive turns of the thread on the worm differ from one another only by a slight increment in radius. This means that when the worm is mounted across the face of the gear, the depth to which the turns of the thread enter the spaces between the gear teeth may be varied by a slight axial adjustment of the worm, and that such adjustment in no way affects the direct contact of the teeth owing to the identity in form of successive turns of the worm. This results in three special advantages:

(1) In the first place the very exact setting of the gear and worm axes required in ordinary worm gearing is unnecessary for after the shafts and bearings have been assembled, the penetration of the worm thread between the gear teeth may be adjusted by merely adjusting the axial position of the worm. It is because of this that the worm and gear with their shafts and bearings may form separate assemblies which may be separately secured to a supporting frame as shown in Figs. 6 and 7.

(2) A second advantage is that a similar axial adjustment of the worm may be used to regulate backlash and particularly to take up backlash after wear. Thus, with the mounting shown in Fig. 6, backlash resulting from wear may be taken out by merely loosening the nut 25 and inserting a shim or spacer between the large end 27 of the worm and the inner races of the ball bearings 24.

(3) A third advantage effects an economy of manufacture for it arises during the cutting of the teeth on the gear. In the case of ordinary worm gearing the sharpening of the thread of the hob which cuts the gear necessarily changes the shape and depth of the teeth formed on the gear so that it is impossible to use a single hob to cut a considerable number of gears accurately. This disadvantage is avoided in making the present gearing, for after the hob for cutting the gear teeth has been sharpened it is necessary only to make a slight axial adjustment of the hob to enable it to cut teeth of precisely the same form and the same depth as those which it produced before it was sharpened.

A further advantage arises from the fact that the distance between the axes of the gear and worm is much less than the radius of the gear instead of being greater than the gear radius as in the case of ordinary worm reduction gearing. It is the relatively short distance between the two axes which permits making the gearing and its mounting in the form of the compact structure shown in Figs. 6 and 7. In this connection it is to be noted that the power capacity of the new gearing is far less dependent on the distance between the axes of the two parts than is the case in ordinary worm gearing. This is due to the fact that the extent of the tooth contact is dependent upon the lead of the worm rather than upon the distance between the axes, and it is a simple matter to select the proper lead in accordance with the equation above given after this distance has been chosen. Hence, when the space available for the gearing is limited by other features of the construction of a machine with which the gearing is to be used, the distance between the axes may be determined to fit the gearing into the required space, and the lead may then be made such as to give complete tooth contact and high power capacity.

An illustrative method for deriving Equation 2 will be described in connection with diagrammatic drawings, Figs. 9 to 12, which illustrate a gearing in which the axes are perpendicular.

Pitch surfaces in the sense used herein are surfaces of revolution tangent to one another along a line. Thus, given a pair of skew axes located in space, it is possible to choose one pitch surface of arbitrary form, which will be referred to as the primary pitch surface, and determine the other from it mathematically. The contact line between such pitch surfaces may be straight or curved.

Referring now specifically to Figs. 9 and 10, it will be seen that front and end views, respectively, of a pair of mating skew axis pitch surfaces are disclosed. The primary pitch surface 120 is a cone, the axis of which is designated by the line 122. The axis of the conjugate pitch surface 124 is designated by the numeral 126, extending at right angles to axis 122 at a distance designated by the letter C, Figs. 9 and 10. This distance C may be measured along a line 128, Figs. 9 and 10, such line being the common perpendicular to axes 122 and 126. The dotted line 130 represents the contact line between the pitch surfaces 120 and 124, and is the locus of points at which said surfaces are tangent to one another.

In the above mentioned diagrammatic representation, the vertex of the cone indicated by the numeral 132 is located an arbitrary distance $a$ from the common perpendicular 128 and the half angle of the cone is an arbitrary angle designated by T.

Given the primary pitch surface 120 and the location of the two axes 122 and 126, the contact line 130 may be determined graphically or analytically. The graphic solution is shown in Figs. 9 and 10. Any point on the contact line 130, such, for example, as the point 134 shown in the diagram, may be located by first choosing an arbitrary reference plane at a distance $x$ from the common perpendicular 128, as shown in Fig. 9. Line 136 of Fig. 9 represents the aforesaid plane as seen on edge in the front view. At the point 138 where this plane intersects the periphery of the cone, a line 140 is drawn which is perpendicular to the peripheral line 142 forming an element of the conical surface 120. The line 140 intersects the axis 122 at 144, and the radial line 146 extending from the point 144 to the axis 126 intersects the plane represented by the line 136 at the point 134. This point 134 is at a point in the reference plane 136, and the conical surface 120, at which the surface 120 is tangent to its conjugate surface 124.

By choosing other values of $x$ and following the procedure outlined above, other contact points may be located in Fig. 9. In this manner a projection of the contact line or locus 130 may be plotted in the front view diagram of Fig. 9. In Fig. 10 the radius of the conical surface 120 in the plane determined by the line 136 is designated by the letter $r$. The point 134 may be located on the end view of the cone in Fig. 10 by merely projecting the point 134 in Fig. 9 until it intersects the arc of the radius $r$ of Fig. 10. Thus two views of the contact line 130 are presented and these are sufficient to determine its entire shape and location. The surface 124 is the surface of revolution swept out by the line 130 rotated about the axis 126, and the surfaces 120 and 124 are tangent to one another along all points on the line 130.

Analytically, the location of the points on the locus or contact line 130 is attained by the following formulas:

Assuming: $x$, $y$ and $z$ are coordinates of a point as shown in Figs. 9 and 10. In this connection it will be noted that $y$ is the distance of the point 134 from the axis 122, and $z$ is the distance of the point 134 from a horizontal plane coincident with the axis 122.

T = the half-angle of the cone as shown in Fig. 9.
C = the distance between the axes 122 and 126.
$a$ = the distance of the cone vertex 122 from a common perpendicular 128.

From the foregoing, the following equations define the locus 130:

(1) $$z = \frac{C}{1 - \dfrac{x}{r \tan T}}$$

(2) $$y = \sqrt{r^2 - z^2}$$

(3) $$r = (a + x) \tan T$$

The conjugate pitch surface 124 is determined graphically as follows:

An arc 148 passing through point 134 struck from the axis 126, Fig. 9, intersects the line 128 at the point 150. The point 150 may be projected into the end view, Fig. 10. It will thus be apparent that the point 150 is located on the axial profile of the pitch surface 124. This procedure may be repeated for several points until the complete profile of the pitch surface 124 is determined. Obviously, the point 150 and the previously located contact point 134 lie in a common plane indicated by the line 152, Fig. 10. As previously indicated, this plane 152 is spaced from the axis 122 a distance designated by $y$, and the point 134 is spaced from the horizontal plane coincident with the axis 122 a distance designated as $z$.

Assume $r_g$=radius of the surface 124 in the transverse cross-section of the plane 152.

$$r_g = \sqrt{(C-z)^2 + x^2}$$

In Figs. 11 and 12 front and end views, respectively, disclose graphically the definition of what might be called an ideal tooth curve on the primary skew axis pitch surface. The surface 120, as previously indicated in Figs. 9 and 10, is the surface of a frustum of a cone corresponding to the arbitrary conical pitch surface. Surface 120 corresponds with a part of the conjugate pitch surface 124 of Figs. 9 and 10 and these two surfaces 120 and 124 are tangent to one another along the locus or contact line 130 previously explained. Gears of this type are usually designed for a fixed angular speed ratio. If a fixed speed ratio is imposed on the mating pitch surfaces, it makes possible the determination of the direction of their relative motion at every point along the locus or contact line 130.

In Fig. 11 the aforesaid relative motion is indicated vectorially. Arbitrarily selecting a point 154 on the locus 130, let it be assumed that the surface 120 is rotating at a fixed angular speed $w_1$. This defines the direction and length of a vector 156, Fig. 11, which is the velocity of a point or particle on the surface 120 located instantaneously at the point 154. Since the ratio is fixed, the surface 124 must rotate at a fixed angular speed $w_2$. Thus, the direction and length of a vector 158, which is the velocity of a point or particle on the surface 124 located instantaneously on the point 154, are determined. Vector 160 indicates the difference of the vectors 156 and 158, and represents the direction and magnitude of relative velocity of the contacting points or particles at the point 154.

From the foregoing it will be obvious that a relative velocity vector corresponding to the vector 160 may be determined at every point along the locus 130, and that its direction in space depends only upon the angular speed ratio of the two pitch surfaces 120 and 124 and not upon the magnitudes of the angular speeds. It will also be obvious that relative velocity vectors such as the vector 160 will be tangent to both pitch surfaces at all points along the locus 130.

It can be shown mathematically that the direction of the relative velocity defines a curve 162 on the pitch surface 120. This curve can be thought of as being "drawn upon" and rotating with the surface 120. As the surface 120 rotates, the curve 162 intersects the locus 130 at a continuously moving point. The direction of velocities shown in Fig. 11 indicates that these points of intersection travel toward the small end of the cone. Thus, at the intersecting point indicated by the numeral 164, curve 162 is co-directional with the relative velocity vector indicated by the numeral 166. The velocity vectors at the point 164 are designated respectively by numerals 168 and 170. The fundamental property of the curve 162 is that at every point at which it intersects the locus or contact line 130, it is co-directional with the relative velocity vector. Obviously other congruent curves having the same property could be indicated as intersecting the locus 130 at points occupying other index positions on the surface 120. Curves, such as the curve 162, may be referred to as "ideal tooth curves." In other words, the direction of the ideal tooth curve at every point along the locus 130 is the same as the direction of the relative velocity vector.

Fig. 14 is a developed view of the conical pitch surface 120 of Figs. 9 to 12, inclusive. When this surface development is wrapped around the cone, points F and G will coincide. Hence, the curve 162 is actually a continuous curve of generally spiral form. If the development illustrated in Fig. 14 is rotated counterclockwise about the vertex 132 while the locus 130 remains fixed, the intersection point of the curve 162 moves continuously along the locus 130 toward the vertex. Curve 162 may be made to intersect every point on the locus 130 within the limits of the development by rotating the cone about its axis. Another position of the ideal tooth curve is designated by the numeral 162a and intersects the locus 130 at the point 162b. These curves at every point of intersection with the locus 130 are co-directional with the relative velocity vector. The dotted line in Fig. 14 shows a curve approximating the curve 162a.

Referring to Fig. 11 it will be seen that vectors 160 and 166 must be tangent to the gear tooth surfaces if conjugate action is to occur at the points 154 and 164. There is only one curve which will satisfy this condition at all points of the locus 130 and that curve is referred to herein as the ideal tooth curve. That is to say, a gear tooth surface containing this curve is capable of conjugate action at all points along the locus 130. This curve will generate a mating curve 172 on the conjugate pitch surface 124, Fig. 11, when the pitch surfaces 120 and 124 are rolled together at the proper speed ratio. If the traces of the gear teeth on the primary pitch surface differ from the above mentioned ideal tooth curve, the conjugate action, if it occurs at all, must occur at points away from the locus 130. This means that the flanks of the gear teeth will consist more and more of generated fillets and less of surfaces having true conjugate action.

Teeth based on the ideal tooth curve would make the best offset skew axis gears. However, such teeth are not easy to produce. A method and apparatus for producing them are disclosed in my co-pending applications Serial Nos. 411,145 and 411,167, filed February 18, 1954. The present application is concerned with the method of producing a tapered helix of constant lead formed on a conical primary pitch surface. In development of this worm, the curve is in the form of an Archimedean spiral. Thus, the trace of the thread 21 of the tapered worm will be co-directional with the ideal tooth curve at only one point, called the pitch point. This point will always lie on the locus 130 as previously described. Its position on this locus can be arbitrarily chosen, but its selection is of importance in properly positioning the zone of action of the mating teeth. The lead of the tapered worm depends primarily upon two factors, namely, the required speed ratio and the location of the pitch point.

Making reference to Figs. 9 and 10, the formulas for determining the lead of the worm may be developed as follows:

$x, y, z$ = coordinates of pitch point as defined in Figs. 9 and 10.

$K = \dfrac{\text{angular speed of pitch cone surface 120}}{\text{angular speed of conjugate surface 124}}$ $r$ = radius of pitch cone in the transverse plane containing the pitch point.

$L$ = the lead, measured along the axis of the cone, of a tapered helix which is co-directional with the ideal tooth curve at the pitch point.

Then $$r = \sqrt{y^2 + z^2}$$

$$L = \frac{2\pi(C-z)}{K - \dfrac{xy}{r^2}}$$

$y$, $z$ and $r$ may be expressed in terms of $x$ and the constants $a$ and $T$. The substitution of these values in the above equation for L gives Equation 2 stated in column 8 of the specification.

The invention is hereby claimed as follows:

1. The method of making a face-type gear for use with a frusto-conical worm having a thread of uniform lead, which comprises hobbing a gear blank with a frusto-conical hob of taper angle T having a thread of uniform lead L and of uniform cross-sectional shape defined by a pressure angle between 20° and 45° on its high side and a pressure angle between 0° and 25° on its low side, rotating the hob and the gear blank during the hobbing at a speed ratio K in excess of 9:1 and feeding the hob into a position in which its axis is at an angle E between 45° and 135° to the axis of the gear at a distance C therefrom which is less than the outer radius R of the gear blank and in which its smaller and larger ends are at the same side of the common perpendicular to the axes of the gear and worm and at distances $x_1$ and $x_2$ from this line and in which the apex of the outer conical surface of the hob lies at the opposite side of this line at a distance $a$ therefrom, the distances C, $x_1$, $x_2$ and $a$ being related to the axis angle E, the speed ratio $k$ and the taper angle T and lead L of the hob in accordance with the following equation:

$$L = \frac{2\pi(C - P \sin \phi)}{K \csc E - \left[\frac{x}{P} \cos \phi + \left(\frac{C}{P} \sin \phi - 1\right) \cot E\right]}$$

where $P = (a+x) \tan T$ $\sin \phi = \frac{B - A\sqrt{A^2 + B^2 - 1}}{A^2 + B^2}$ $A = -\cot E \cot T$ $B = \frac{P + x \cot T}{C}$ and $x$ has a value between $x_1$ and $x_2$, so that the teeth formed on the gear are substantially free from inoperative fillets.

2. The method as claimed in claim 1 in which the axis of the hob is maintained at right angles to the axis of the gear blank and the distances C, $x_1$, $x_2$ and $a$ are related to the speed ratio K and the taper angle T and lead L of the hob in accordance with the following equation:

$$L = \frac{2\pi C}{K\left[\frac{(a+x) \tan^2 T + x}{x}\right] - \frac{\sqrt{[(a+x) \tan^2 T + x]^2 - C^2 \tan^2 T}}{(a+x) \tan T}}$$

where $x$ has a value between $x_1$ and $x_2$, so that the teeth formed on the gear are substantially free from inoperative fillets.

References Cited in the file of this patent

UNITED STATES PATENTS

| | | |
|---|---|---|
| 1,888,782 | Zimmermann | Nov. 22, 1932 |
| 2,119,295 | Schicht | May 31, 1938 |
| 2,171,406 | Schicht | Aug. 29, 1939 |
| 2,282,288 | Plensler | May 5, 1942 |